United States Patent
Loos et al.

(10) Patent No.: US 10,700,336 B2
(45) Date of Patent: Jun. 30, 2020

(54) CURRENT COLLECTOR FOR ELECTROCHEMICAL ENERGY STORAGE APPARATUS

(71) Applicant: Bayerische Motoren Werke Aktiengesellschaft, Munich (DE)

(72) Inventors: Daniel Loos, Munich (DE); Andreas Schleicher, Munich (DE); Robert Lustig, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 47 days.

(21) Appl. No.: 15/499,354

(22) Filed: Apr. 27, 2017

(65) Prior Publication Data

US 2017/0229699 A1    Aug. 10, 2017

Related U.S. Application Data

(63) Continuation of application No. PCT/EP2015/073142, filed on Oct. 7, 2015.

(30) Foreign Application Priority Data

Oct. 31, 2014   (DE) .................. 10 2014 222 261

(51) Int. Cl.
*H01M 2/26*     (2006.01)
*H01M 10/0525*  (2010.01)

(52) U.S. Cl.
CPC ....... *H01M 2/263* (2013.01); *H01M 10/0525* (2013.01); *H01M 2220/20* (2013.01); *Y02E 60/122* (2013.01); *Y02T 10/7011* (2013.01)

(58) Field of Classification Search
CPC .......................... H01M 2/263; H01M 10/0525
(Continued)

(56) References Cited

U.S. PATENT DOCUMENTS

| 2005/0142439 A1* | 6/2005 | Lee ............... H01M 2/021 429/163 |
| 2011/0223454 A1 | 9/2011 | Urano et al. |

(Continued)

FOREIGN PATENT DOCUMENTS

| CN | 103165850 A | 6/2013 |
| CN | 103490039 A | 1/2014 |

(Continued)

OTHER PUBLICATIONS

Wataji, Taku, Machine Translation of JP-2012169064-A, Sep. 2012 (Year: 2012).*

(Continued)

*Primary Examiner* — Sean P Cullen
(74) *Attorney, Agent, or Firm* — Crowell & Moring LLP

(57) ABSTRACT

An electrochemical energy storage apparatus, in particular a rechargeable lithium-ion battery, having at least one current collector device with at least one current conductor arm, and at least one energy storage cell which has at least one anode, one cathode and one separator. The separator touches the anode and the cathode at least in sections in, in each case, a separator contact area. The current conductor arm can be electrically conductively connected to, in each case, at least one anode or cathode by way of a current output conductor contact area. A surface normal on the current output conductor contact area and a surface normal on the separator contact area form an acute angle a. This angle a is selected from a range which is greater than 5°, with preference greater than 15°, preferably greater than 25° and particularly preferably greater than 35°, and furthermore the angle α is less than or equal to 90°, with preference less than 75°, preferably less than 65° and particularly preferably less than 45°.

13 Claims, 2 Drawing Sheets

(58) Field of Classification Search
USPC .................................................. 429/160, 161
See application file for complete search history.

(56) References Cited

U.S. PATENT DOCUMENTS

| | | | | |
|---|---|---|---|---|
| 2012/0164501 A1* | 6/2012 | Guen | ................... | H01M 2/263 429/94 |
| 2012/0258342 A1 | 10/2012 | Tstsumi et al. | | |
| 2012/0315531 A1* | 12/2012 | Lev | ..................... | H01M 2/0212 429/159 |
| 2013/0189569 A1* | 7/2013 | Youm | ................... | H01M 10/04 429/185 |
| 2013/0330593 A1* | 12/2013 | Kim | ........................ | H01M 2/26 429/149 |
| 2014/0120396 A1* | 5/2014 | Kajiwara | .............. | H01M 2/263 429/94 |
| 2015/0024264 A1* | 1/2015 | Tononishi | .............. | H01G 11/82 429/186 |
| 2015/0287999 A1* | 10/2015 | Guen | ................... | H01M 2/024 429/179 |
| 2015/0325832 A1 | 11/2015 | Saito et al. | | |

FOREIGN PATENT DOCUMENTS

| | | | | |
|---|---|---|---|---|
| EP | 2 595 219 A1 | | 5/2013 | |
| EP | 2 790 250 A2 | | 10/2014 | |
| JP | 2012169064 A | * | 9/2012 | |
| JP | 2013125657 A | * | 6/2013 | |
| WO | WO-2012176704 A1 | * | 12/2012 | ............ H01M 2/263 |
| WO | WO-2013125271 A1 | * | 8/2013 | ............ H01G 11/82 |
| WO | WO 2014/037786 A1 | | 3/2014 | |
| WO | WO 2014/118873 A1 | | 8/2014 | |

OTHER PUBLICATIONS

Hosokawa, Takashi, Machine Translation of JP-2013125657-A, Jun. 2013 (Year: 2013).*
German Search Report issued in counterpart German Application DE 10 2014 222 261.3 dated Aug. 3, 2015 with partial English translation (eleven (11) pages).
International Search Report (PCT/ISA/210) issued in PCT Application No. PCT/EP2015/073142 dated Nov. 25, 2015 with English translation (five (5) pages).
German-language Written Opinion (PCT/ISA/237) issued in PCT Application No. PCT/EP2015/073142 dated Nov. 25, 2015 (five (5) pages).
Chinese-language Office Action issued in counterpart Chinese Application No. 201580043904.5 dated Oct. 9, 2018 with English translation (12 pages).
Chinese-language Office Action issued in counterpart Chinese Application No. 201580043904.5 dated Jun. 12, 2019 with English translation (13 pages).

* cited by examiner

Fig. 3A
Fig. 3B
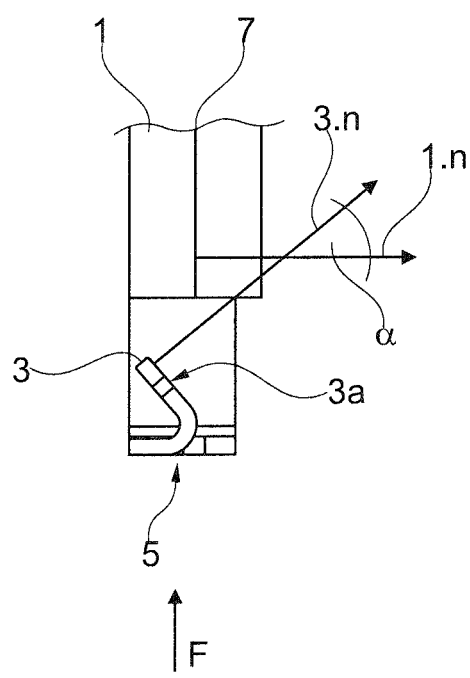
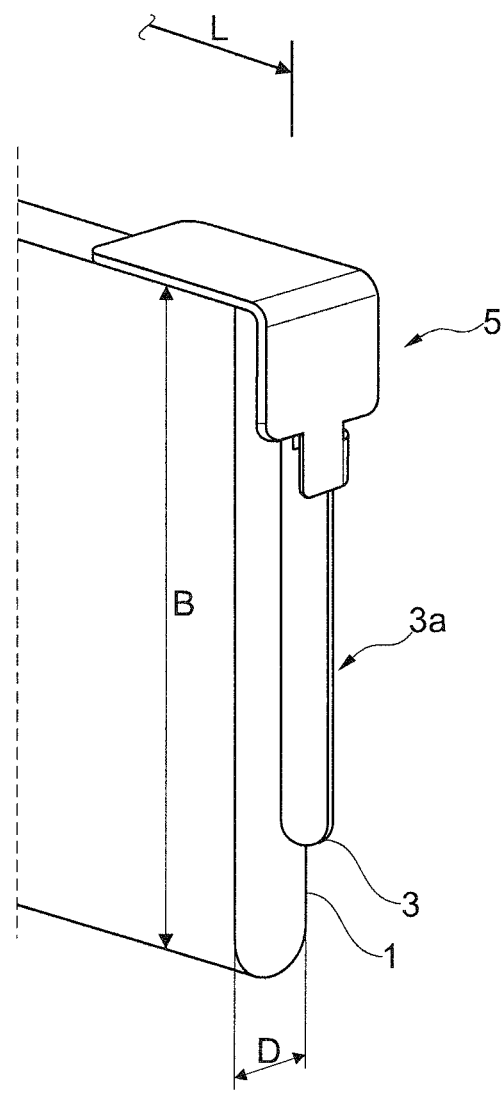

CURRENT COLLECTOR FOR ELECTROCHEMICAL ENERGY STORAGE APPARATUS

CROSS REFERENCE TO RELATED APPLICATIONS

This application is a continuation of PCT International Application No. PCT/EP2015/073142, filed Oct. 7, 2015, which claims priority under 35 U.S.C. § 119 from German Patent Application No. 10 2014 222 261.3, filed Oct. 31, 2014, the entire disclosures of which are herein expressly incorporated by reference.

BACKGROUND AND SUMMARY OF THE INVENTION

The invention relates to an electrochemical energy storage apparatus, in particular a rechargeable lithium-ion battery having at least one current collector device. An energy storage apparatus of this type is known from EP 2 595 219 A1.

The invention is described below with reference to an electrochemical energy store for a motor vehicle for supplying the driving motor with electrical power (traction battery); this should not be understood as a limitation of the invention to such an application.

Rechargeable batteries having highly reactive contents are generally used in motor vehicles. Therefore, the safeguarding of said rechargeable batteries is of great importance. Due to external loads, the storage battery may become deformed in the event of an accident. It is generally considered advantageous if the rechargeable battery withstands a high degree of deformation without reacting in an uncontrolled manner.

One reason for an uncontrollable reaction of the rechargeable battery can arise due to a short circuit of the anodes with the cathodes; in this case, the contents of the rechargeable battery can ignite due to heating or sparking and can react further. A short circuit of this type can be caused by the penetration of electric conductors, such as the latter in the form of what are referred to as current collectors, within the rechargeable battery. The current collectors or current output conductors are intended firstly to be able to be produced cost-effectively, but also, during regular operation, to have the function of diverting current from the anodes/cathodes (electrodes) to the electric terminal of the rechargeable battery. This in particular permits electrical contact connection of the energy storage cell to the outside. In the event of a crash, they are not intended, or are intended only to a small extent, to lead to a short circuit in the rechargeable battery or in an energy storage cell.

Current output conductor devices having two symmetrically formed current conductor arms are known from EP 2 595 219 A1, wherein the current conductor arms are oriented parallel to separator contact areas, i.e. to separating areas between the electrodes.

It is an object of the invention to increase the operational reliability of an electrochemical energy storage apparatus; in particular, it is a further object of the invention to increase the storage density of the rechargeable battery.

This and other objects are achieved by an electrochemical energy storage apparatus, in particular a rechargeable lithium-ion battery, having at least one current collector device with at least one current conductor arm, and at least one energy storage cell which has at least one anode, one cathode and one separator. The separator touches the anode and the cathode at least in sections in, in each case, a separator contact area. The current conductor arm can be electrically conductively connected to, in each case, at least one anode or cathode by way of a current output conductor contact area. A surface normal on the current output conductor contact area and a surface normal on the separator contact area form an acute angle $\alpha$. This angle $\alpha$ is selected from a range which is greater than 5°, with preference greater than 15°, preferably greater than 25° and particularly preferably greater than 35°, and furthermore the angle $\alpha$ is less than or equal to 90°, with preference less than 75°, preferably less than 65° and particularly preferably less than 45°.

At least one or more electrochemical energy storage cells are arranged in an electrochemical energy storage apparatus. In an electrochemical energy storage cell of this type, anodes and cathodes are layered, wound or stacked and are, in each case, separated from one another by a separator. Such a stack of cells or windings can be understood in particular to be the electrochemically active part of the energy storage cell. The anodes and/or the cathodes are preferably electrically conductively contacted at least in sections by a current collector device. The current collector device preferably has one or more current conductor arms. The current conductor arms contact the anodes and/or the cathodes within a current output conductor contact area. The contact areas between the separator and the anodes and/or cathodes and the current output conductor contact area are generally oriented parallel to one another in the known prior art. An energy storage cell preferably has a length, width and a thickness. The thickness of the storage cell is substantially determined here by the number of layers (anode, cathode, separator). It is known from the prior art that the current output conductor contact area extends, at least in sections, in the length and width direction.

According to the invention, a surface normal on the current output conductor contact area, or preferably on a tangential plane on said contact area, and a surface normal on the separator contact area encloses an acute angle $\alpha$. Furthermore preferably, the acute angle $\alpha$ is selected from a range which is >5°, with preference >15°, preferably >25° and particularly preferably >35°. Furthermore, the angle $\alpha$ is ≤90°, with preference ≤75°, preferably <65° and particularly preferably <45°.

Within the context of the invention, an electrochemical energy storage cell should be understood as meaning a device in which electrical energy can be stored in chemically bound form and which has at least two, but preferably a multiplicity of, layers for said storage. An electrochemical energy storage cell preferably has at least one anode and one cathode, wherein said anode and cathode are with preference layered or preferably stacked; constructional forms of this type are known in the case of lithium-ion storage cells as so-called jelly-roll cells, pouch cells or coffee bag cells. Furthermore preferably, a storage cell of this type should be understood as meaning a lithium-ion energy storage cell or lithium-air energy storage cell. Furthermore preferably, a cell of this type at least substantially has a prismatic basic geometry, in particular in contrast to cylindrical or rod-shaped storage cells.

Furthermore preferably, the storage cell is designed as a so-called coffee bag cell, pouch cell or jelly roll cell. Cells of this type share the feature in particular that they have a longitudinal extent, a width extent and a thickness extent, wherein the thickness extent is smaller, in particular substantially smaller (at max. 50%), at least one of the two other extents. The thickness extent is substantially determined here by the number of layered anodes, cathodes and separators, whereas the width and longitudinal extent can be more or less freely determined.

Within the context of the invention, a current collector device should be understood as meaning a device for the electrically conductive connection of the electrochemically active part of the energy storage cell to further electric terminals for the electrical contacting of the energy storage cell, in particular to the poles of the energy storage cell. The current collector device is preferably connectable to the electrodes (anodes or cathodes) of the energy storage cell. The current collector device preferably has at least one current conductor arm.

Within the context of the invention, a current conductor arm should be understood to mean a portion of the current collector device that is designed for electrical contacting connection with at least one electrode. Furthermore preferably, the current conductor arm contacts the electrodes in a current output conductor contact area. The current conductor arm preferably extends along or in the direction of a side edge of the energy storage cell, with preference in the direction of the longitudinal extent or preferably in the direction of the width extent. Furthermore preferably, the storage arm is inclined about the extent direction, and in particular, as a result, the current output conductor contact area and the separator contact area are not oriented parallel to each other. In contrast thereto, in the case of current output conductor devices known from the prior art, the current output conductor contact area and the separator contact area are oriented parallel to each other.

Within the context of the invention, a separator contact area should be understood to mean a separating area between two adjacently arranged electrodes (anode/cathode), wherein the latter are separated from each other, at least in sections, by a separator and are contacted by the latter. Furthermore, the separator contact area should be understood as meaning an at least substantially flat contact area between a separator and one of the electrodes. Furthermore preferably, the separator contact area should be understood as meaning an area portion between an electrode and the separator that extends at least substantially in the longitudinal extent and the width extent of the electrochemical energy storage cell. In visual terms, the separator contact area should be understood as meaning in particular a stacking plane of the electrode stack.

In particular by means of an angle $\alpha$ according to the invention between a surface normal on the current output conductor contact area and a surface normal on the separator contact area, a larger current output conductor contact area can be realized within the same construction space. Generally, the electrical resistance of a connection depends in particular on the size of the contact area and tends to drop with a larger area. With an increased current output conductor contact area, it is therefore possible firstly to improve the efficiency of the energy storage apparatus and secondly to increase the operational reliability thereof.

In a preferred embodiment, the current collector device has a second current conductor arm. The second current conductor arm preferably extends in a basically parallel extent to the first current conductor arm. The parallelism preferably does not relate to the inclination of the current conductor arms. Furthermore preferably, the second current conductor arm contacts at least one electrode in a second current output conductor contact area. Furthermore preferably, a surface normal on the separator contact area and a surface normal on the second current output contact area encloses an acute angle $\beta$. The acute angle $\beta$ is preferably selected from a range which is >5°, with preference >15°, preferably >25° and particularly preferably >35°, and furthermore with preference the angle $\beta$ is ≤90°, with preference <75°, preferably <65° and particularly preferably <45°. In particular, the current output conductor contact area can be further increased by use of two current conductor arms, or electrodes of different potential can be connected to the current conductor arms; in particular, the efficiency and the operational reliability of the energy storage apparatus can thereby be further improved.

In a preferred embodiment, the first and the second current conductor arm are inclined diametrically opposed to each other (angles $\alpha$, $\beta$). In particular because of the diametrically opposed inclination of the current conductor arms, a V-like or roof-like profile is produced in a plane which is arranged orthogonally to the axis of inclination ($\alpha$, $\beta$) of the current conductor arms. Furthermore preferably, the V-like profile is oriented in such a manner that the portion having the smallest distances between the first and the second current conductor arm face the energy storage cell. Investigations have shown that in particular two current conductor arms inclined diametrically opposed to each other have a positive effect on the operational reliability of the energy storage cell.

In a preferred embodiment, the current conductor arms are arranged mirror-symmetrically with respect to each other at least in sections or completely. Preferably, the current conductor arms are arranged mirror-symmetrically with respect to each other in sections or preferably completely, at least in the region of the current output conductor contact areas. In particular by way of this arrangement of the current conductor arms, a particularly simple and cost-effective production of same is permitted.

In a preferred embodiment, the energy storage apparatus has at least one first and one second energy storage cell. Separator contact areas of the first and second energy storage cell are preferably arranged parallel to each other at least in sections. Furthermore preferably, the first current conductor arm can be electrically conductively connected to the first energy storage cell, and the second current conductor arm can preferably be electrically conductively connected to the second energy storage cell. In particular by increasing the number of electrochemical energy storage cells, the storage capacity of an energy storage apparatus can be extended and therefore an improved energy storage apparatus can be produced.

In a preferred embodiment, an imaginary separating area is arranged between the first energy storage cell and the second energy storage cell. The separating area preferably has a flat profile at least in sections or completely. Furthermore preferably, the separating area should be understood as a parallel plane to one or more of the separator contact areas.

The first current conductor arm is preferably arranged in such a manner that at least the current output conductor contact area on the side of the first energy storage cell extends as far as the separating area or is spaced apart therefrom in sections or completely by a distance t1. Furthermore preferably, the second current conductor arm is arranged in such a manner that the latter or the second current output conductor contact area, on the side of the second energy storage cell extends as far as the separating area or is spaced apart therefrom in sections or completely preferably by a distance t.2. In particular, in the event of an unplanned deformation of the electrochemical energy storage apparatus (crash situation), it has proven particularly advantageous if the current conductor arms are arranged as described, in particular with an inclination.

BRIEF DESCRIPTION OF THE DRAWINGS

FIGS. 3A and 3B show a further embodiment of the invention.

DETAILED DESCRIPTION OF THE DRAWINGS

Figure 1A:
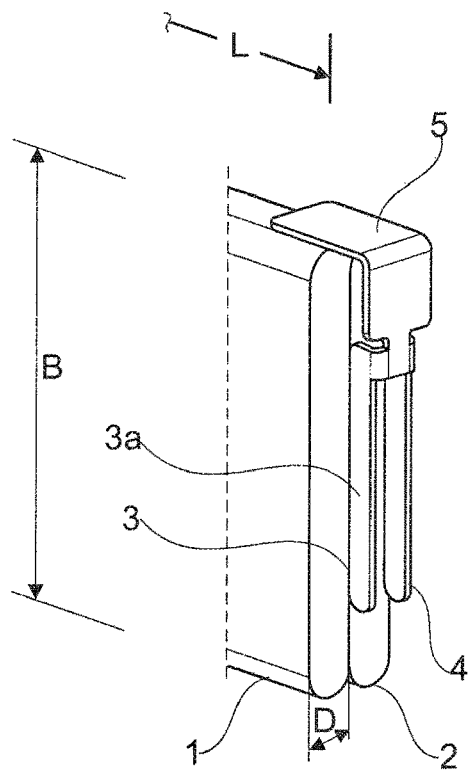
FIGS. 1A and 1B show an energy storage apparatus as is known from the prior art.

FIG. 1A illustrates a partial portion of an energy storage apparatus as is known from the prior art. The energy storage apparatus has two energy storage cells 1, 2. The electrodes (not illustrated) of the energy storage cells 1, 2 can be connected to the current output conductor device 5. For this purpose, the current output conductor device 5 has a first current conductor arm 3 and a second current conductor arm 4. A current output conductor contact area is arranged on each of the current conductor arms, illustrated here as an area 3a only for the first current conductor arm 3.

The energy storage cells have a width extent B, a longitudinal extent L and a thickness extent D. The complete longitudinal extent L of the energy storage cells is not illustrated here.

Figure 1B:
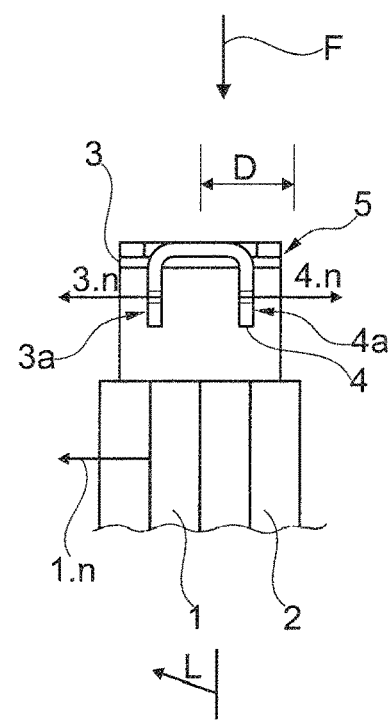

It can be seen in the top view in FIG. 1B that a surface normal on the cell stack or a separator contact area (not illustrated) of an energy storage cell 1 points in the direction 1.n. The surface normal 1.n is parallel to the surface normal 3.n. The surface normal 3.n is the surface normal on the current output conductor contact area 3a which is arranged on the first current conductor arm 3 and is designed for contacting the electrodes (not illustrated) of the first energy storage cell 1. The surface normal 4.n should likewise be understood as the surface normal of the contact area 4a of the second current conductor arm 4. In the event of a deformation in the direction F, the current conductor arms 3, 4 can penetrate into the energy storage cells 1, 2 and can cause a short circuit therein. Further damage in the energy storage cells may occur due to a short circuit in the energy storage cells 1, 2.

Figure 2B:
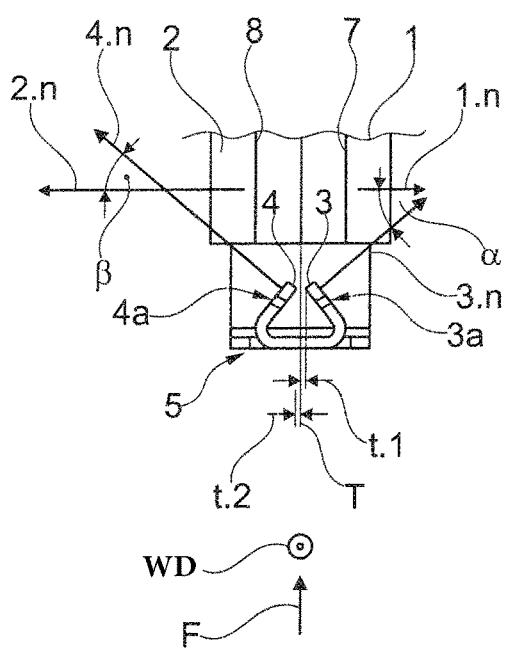
FIGS. 2A and 2B shows the top view and a perspective view of a current output conductor according to an embodiment of the invention.
Figure 2A:
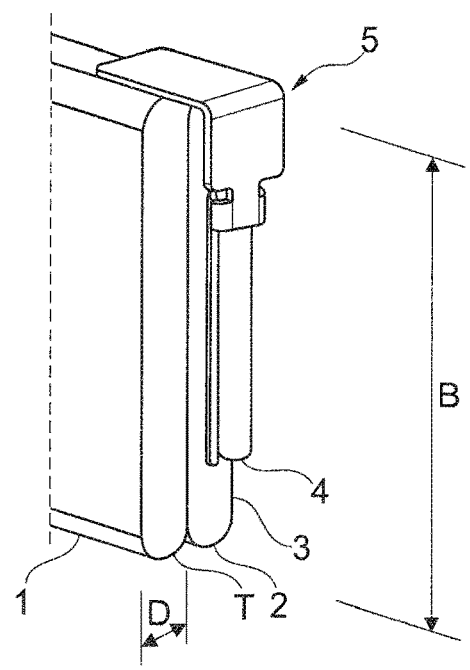

FIGS. 2A and 2B illustrate an exemplary energy storage apparatus according to the invention. FIG. 2A shows a perspective partial illustration of an energy storage apparatus and FIG. 2B shows a top view of the energy storage apparatus. The energy storage cells 1, 2 are separated from each other by a separating plane T. It can be seen that, in contrast to the solution known from the prior art, the current conductor arms 3, 4 are rotated about the axis in the width direction WD. The surface normal 4.n encloses the acute angle β with the normal 2.n on a separator contact area 8. The same applies for the first energy storage cell 1. The normal 3.n of the first current conductor arm 3 on the current output conductor contact area 3a encloses the acute angle α here with the normal on the separator contact area 7 of the energy storage cell 1.

The first current conductor arm 3 is arranged in the region of the thickness extent D of the first energy storage cell 1 and extends to the separating plane T up to the distance t.1. The second current conductor arm 4 is arranged in the thickness region of the second energy storage cell 2 and extends to the separating plane T up to the distance t.2. In this embodiment, the two current conductor arms 3, 4 with the current output conductor contact areas 3a, 4a are arranged mirror-symmetrically with respect to the separating plane T. The current conductor arms are pushed into the energy storage cells 1, 2 in the deformation direction F as a type of plough or wedge, and the tendency to cause a short circuit in the energy storage cells is reduced or avoided by this geometrical shape.

FIGS. 3A and 3B illustrate a top view and a partially perspective view of an energy storage apparatus, respectively. The surface normal 1.n on the separator contact area 7 of the storage cell 1 encloses an acute angle α with the surface normal 3.n on the current output conductor contact area 3a of the first current conductor arm 3. In the event of a deformation in the direction F, the tendency to produce a short circuit is reduced in comparison to the known prior art by way of the first current conductor arm 3 of the current output conductor device 5.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An electrochemical energy storage apparatus, comprising:
    at least one current collector device with at least one first current conductor arm;
    at least one first energy storage cell which has at least one anode, one cathode and one separator in a first arrangement; and
    at least one second energy storage cell which is different from the at least one first energy storage cell,
    wherein the separator touches the anode and the cathode at least in sections in, in each case, a separator contact area,
    the first current conductor arm is electrically conductively connectable to, in each case, at least one anode or cathode via a current output conductor contact area,
    a surface normal on the current output conductor contact area and a surface normal on the separator contact area enclose an acute angle α,
    the angle α is greater than 5° and is less than 90°,
    the first current conductor arm is electrically conductively connectable to the first energy storage cell and disposed at least in part externally of the first arrangement,
    a second current conductor arm is electrically conductively connectable to the second energy storage cell, and
    the first and second current conductor arms are inclined diametrically opposed to each other such that the first and second current conductor arms form a V-shape profile disposed such that a bottom end of the V-shape profile, at which a vertex of the V-shape profile is located, is closer to the at least one first and second energy storage cells than a top-end of the V-shape profile.

2. The electrochemical energy storage apparatus according to claim 1, wherein the apparatus is a rechargeable lithium-ion battery.

3. The electrochemical energy storage apparatus according to claim 1, wherein
    the angle α is greater than 35° and is less than 45°.

4. The electrochemical energy storage apparatus according to claim 1, wherein the first arrangement is a bag cell or a pouch cell.

5. The electrochemical energy storage apparatus according to claim 1, wherein
the first and second current conductor arms are arranged mirror symmetrically with respect to each other at least in sections or completely.

6. The electrochemical energy storage apparatus according to claim 1, wherein
the first current conductor arm is disposed at least in part externally of the first energy storage cell, and
the second current conductor arm is disposed at least in part externally of the second energy storage cell.

7. The electrochemical energy storage device according to claim 1, wherein
a separating area is arranged between the first energy storage cell and the second energy storage cell,
the first current conductor arm on a side of the first energy storage cell extends as far as said separating area or is spaced apart therefrom by a first defined distance, and
the second current conductor arm on a side of the second energy storage cell extends as far as said separating area or is spaced apart therefrom by a second defined distance.

8. The electrochemical energy storage apparatus according to claim 1, wherein
the current collector device has the second current conductor arm,
a surface normal on a second current output contact area and the surface normal on the separator contact area encloses an acute angle $\beta$,
the angle $\beta$ is greater than 5° and is less than 90°.

9. The electrochemical energy storage apparatus according to claim 8, wherein
the angle $\beta$ is greater than 35° and is less than 45°.

10. The electrochemical energy storage apparatus according to claim 8, wherein
the angle $\alpha$ is greater than 35° and is less than 45°, and
the angle $\beta$ is greater than 35° and is less than 45°.

11. The electrochemical energy storage apparatus according to claim 8, wherein
the first and second current conductor arms each are rotated about an axis of a width direction of the first and second energy cells, respectively to form the angle $\alpha$ and the angle $\beta$, respectively.

12. An electrochemical energy storage apparatus, comprising:
at least one current collector device with at least one first current conductor arm;
at least one first energy storage cell which has at least one anode, one cathode and one separator in a first arrangement; and
at least one second energy storage cell which is different from the at least one first energy storage cell and disposed outside the first arrangement,
wherein the separator touches the anode and the cathode at least in sections in, in each case, a separator contact area,
the first current conductor arm is electrically conductively connectable to, in each case, at least one anode or cathode via a current output conductor contact area,
a surface normal on the current output conductor contact area and a surface normal on the separator contact area enclose an acute angle $\alpha$,
the angle $\alpha$ is greater than 5° and is less than 90°,
the first current conductor arm is electrically conductively connectable to the first energy storage cell,
a second current conductor arm is electrically conductively connectable to the second energy storage cell, and
the first and second current conductor arms are inclined diametrically opposed to each other such that the first and second current conductor arms form a V-shape profile disposed such that a bottom end of the V-shape profile, at which a vertex of the V-shape profile is located, is closer to the at least one first and second energy storage cells than a top-end of the V-shape profile.

13. The electrochemical energy storage apparatus according to claim 12, wherein the first arrangement is a bag cell or a pouch cell.

* * * * *